United States Patent
Ahmed et al.

(10) Patent No.: US 11,003,201 B1
(45) Date of Patent: May 11, 2021

(54) LOW QUIESCENT CURRENT LOW-DROPOUT REGULATOR (LDO)

(71) Applicant: QUALCOMM Incorporated, San Diego, CA (US)

(72) Inventors: Shamim Ahmed, Tempe, AZ (US); David Eric Haglan, Tempe, AZ (US)

(73) Assignee: QUALCOMM INCORPORATED, San Diego, CA (US)

( * ) Notice: Subject to any disclaimer, the term of this patent is extended or adjusted under 35 U.S.C. 154(b) by 45 days.

(21) Appl. No.: 16/696,409

(22) Filed: Nov. 26, 2019

(51) Int. Cl.
*G05F 1/575* (2006.01)
*G05F 1/59* (2006.01)
*H04B 1/3827* (2015.01)

(52) U.S. Cl.
CPC .............. *G05F 1/575* (2013.01); *G05F 1/59* (2013.01); *H04B 1/3827* (2013.01)

(58) Field of Classification Search
CPC ..... G05F 1/02; G05F 1/46; G05F 1/56; G05F 1/575; G05F 1/59; H04B 1/3827
See application file for complete search history.

(56) References Cited

U.S. PATENT DOCUMENTS

| | | | | |
|---|---|---|---|---|
| 7,199,565 B1* | 4/2007 | Demolli | ................. | G05F 1/575 323/273 |
| 8,289,009 B1* | 10/2012 | Strik | ...................... | G05F 1/575 323/272 |
| 2006/0028188 A1* | 2/2006 | Hartular | ................. | H02M 3/156 323/273 |
| 2006/0261790 A1* | 11/2006 | Tai | .......................... | G05F 1/575 323/274 |
| 2010/0277148 A1* | 11/2010 | Zhao | ....................... | G05F 1/571 323/282 |
| 2011/0121802 A1* | 5/2011 | Zhu | .......................... | G05F 1/575 323/281 |
| 2011/0193538 A1* | 8/2011 | Arigliano | ................ | G05F 1/563 323/282 |
| 2013/0119954 A1* | 5/2013 | Lo | ............................. | G05F 1/10 323/280 |
| 2014/0043875 A1* | 2/2014 | Hsing | ................. | H02M 7/2176 363/77 |
| 2015/0115918 A1* | 4/2015 | Oikarinen | ............... | G05F 1/575 323/280 |
| 2021/0034087 A1* | 2/2021 | Liu | ......................... | G05F 1/575 |

* cited by examiner

*Primary Examiner* — Adolf D Berhane
(74) *Attorney, Agent, or Firm* — Patterson+ Sheridan, L.L.P.

(57) ABSTRACT

A low-dropout (LDO) regulator and an associated method and apparatus are described. The LDO regulator generally includes a first transistor coupled between an input voltage node and an output voltage node of the LDO regulator. The LDO regulator further includes a first amplifier having an output coupled to a gate of the first transistor, wherein a feedback path couples the output voltage node to an input of the first amplifier. The LDO regulator further includes a second amplifier having an output coupled to an enable input of the first amplifier, wherein a voltage-sensing path couples the input voltage node to an input of the second amplifier. The LDO regulator further includes and a second transistor coupled between the gate of the first transistor and a reference potential node, the output of the second amplifier being coupled to a gate of the second transistor.

20 Claims, 3 Drawing Sheets

LOW QUIESCENT CURRENT LOW-DROPOUT REGULATOR (LDO)

TECHNICAL FIELD

Certain aspects of the present disclosure generally relate to electronic circuits and, more particularly, to circuits for voltage regulation.

BACKGROUND

A voltage regulator ideally provides a constant direct current (DC) output voltage regardless of changes in load current or input voltage. Voltage regulators may be classified as linear regulators or switching regulators. While linear regulators tend to be small and compact, many applications may benefit from the increased efficiency of a switching regulator. A linear regulator may be implemented by a low-dropout (LDO) regulator, for example. A switching regulator may be implemented, for example, by a switched-mode power supply (SMPS), such as a buck converter, a boost converter, or a buck-boost converter.

Power management integrated circuits (power management ICs or PMICs) are used for managing the power requirement of a host system. A PMIC may be used in battery-operated devices, such as mobile phones, tablets, laptops, wearables, etc., to control the flow and direction of electrical power in the devices. The PMIC may perform a variety of functions for the device such as direct-current (DC)-to-DC conversion, battery charging, power-source selection, voltage scaling, power sequencing, etc. For example, a PMIC may be used for voltage regulation and may feature an LDO regulator.

SUMMARY

Certain aspects of the present disclosure generally relate to a low quiescent current low-dropout (LDO) regulator.

Certain aspects of the present disclosure provide a circuit for voltage regulation. The circuit generally includes a first transistor coupled between an input voltage node and an output voltage node of the circuit. The circuit further includes a first amplifier having an output coupled to a gate of the first transistor, wherein a feedback path couples the output voltage node to an input of the first amplifier. The circuit further includes a second amplifier having an output coupled to an enable input of the first amplifier, wherein a voltage-sensing path couples the input voltage node to an input of the second amplifier. The circuit further includes a second transistor coupled between the gate of the first transistor and a reference potential node, the output of the second amplifier being coupled to a gate of the second transistor.

Certain aspects of the present disclosure provide a method for power regulation. The method generally includes performing a first comparison, via a first amplifier, of an output voltage with a reference voltage, regulate, via a first transistor, an input voltage at an input voltage node to generate the output voltage at an output voltage node based on the first comparison, performing a second comparison, via a second amplifier, of the input voltage with the reference voltage, and shorting, via the first transistor, the input voltage node to the output voltage node by controlling a second transistor based on the second comparison.

Certain aspects of the present disclosure provide an apparatus for power regulation. The method generally includes means for performing a first comparison of the output voltage with a reference voltage, means for regulating an input voltage at an input voltage node to generate the output voltage at an output voltage node based on the first comparison, means for performing a second comparison of the input voltage with the reference voltage, and means for shorting the input voltage node to the output voltage node by controlling a second transistor based on the second comparison.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

An Example Device

Figure 1:
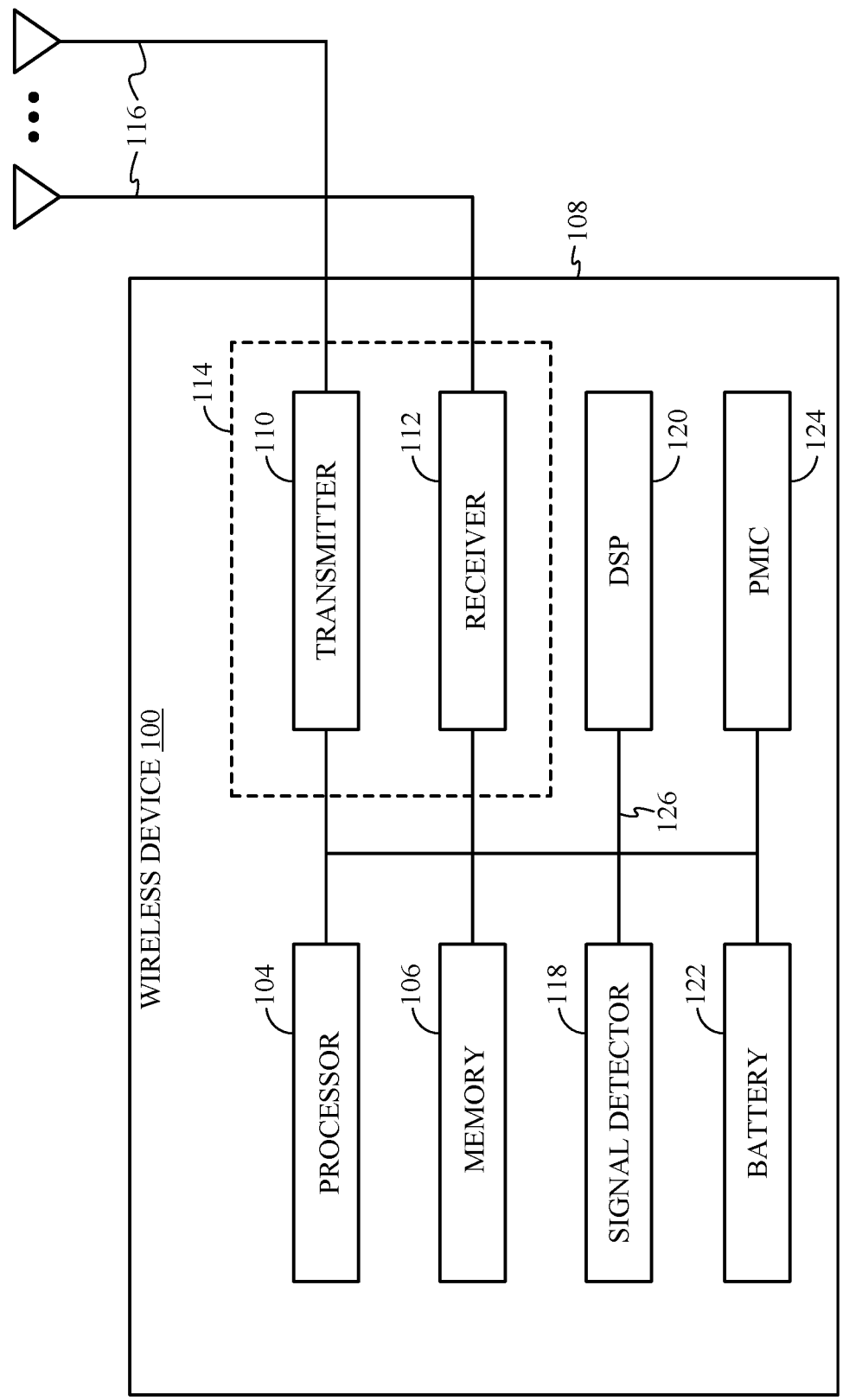
FIG. 1 is a block diagram of an example device including a voltage regulator, according to certain aspects of the present disclosure.

FIG. 1 is a block diagram of an example device 100. The device 100 may be a battery-operated device such as a cellular phone, a personal digital assistant (PDA), a handheld device, a wireless modem, a laptop computer, a tablet, a personal computer, etc. The device 100 is an example of a device that may be configured to implement the various systems and methods described herein.

The device 100 may include a processor 104 that controls operation of the device 100. The processor 104 may also be referred to as a central processing unit (CPU). Memory 106, which may include both read-only memory (ROM) and random access memory (RAM), provides instructions and data to the processor 104. A portion of the memory 106 may also include non-volatile random access memory (NVRAM). The processor 104 typically performs logical and arithmetic operations based on program instructions stored within the memory 106. The instructions in the memory 106 may be executable to implement the methods described herein.

The device 100 may also include a housing 108 that may include a transmitter 110 and a receiver 112 to allow transmission and reception of data between the device 100 and a remote location. The transmitter 110 and receiver 112 may be combined into a transceiver 114. A plurality of transmit antennas 116 may be attached to the housing 108 and electrically coupled to the transceiver 114. The device 100 may also include (not shown) multiple transmitters, multiple receivers, and multiple transceivers.

The device 100 may also include a signal detector 118 that may be used in an effort to detect and quantify the level of signals received by the transceiver 114. The signal detector 118 may detect such signals as total energy, energy per subcarrier per symbol, power spectral density and other signals. The device 100 may also include a digital signal processor (DSP) 120 for use in processing signals.

The device 100 may further include a battery 122 used to power the various components of the device 100. The device 100 may also include a power management integrated circuit (power management IC or PMIC) 124 for managing the power from the battery to the various components of the device 100. The PMIC 124 may perform a variety of functions for the device such as DC-to-DC conversion, battery charging, power-source selection, voltage scaling, power sequencing, etc. In certain aspects, the PMIC 124 includes a voltage regulator (e.g., a low-dropout (LDO) regulator) as described herein.

The various components of the device 100 may be coupled together by a bus system 126, which may include a power bus, a control signal bus, and a status signal bus in addition to a data bus.

Example Low-Dropout (LDO) Regulator

Certain aspects of the present disclosure generally relate to a voltage regulator (e.g., a low-dropout (LDO) regulator). Conventional LDOs for battery-operated devices, which are generally designed to have outputs between 2.9 V and 3.3 V, may enter into a drop-out zone of operation when the battery voltage drops below a certain voltage threshold (e.g., when the difference between the input voltage and the output voltage falls below the dropout voltage for the LDO, where the dropout voltage is the specified minimum voltage across the LDO to maintain regulation). For example, an LDO may enter the drop-out zone of operation when the input voltage (e.g., battery voltage) to be regulated is close to the target output voltage of the LDO regulator. In the drop-out zone of operation, the quiescent current ($I_Q$) may dramatically increase and cause the battery to discharge quickly. Also referred to as the ground current or supply current, the $I_Q$ is the current drawn by the LDO in order to control its internal circuitry, such as the pass device, for proper operation. The $I_Q$ of the LDO accounts for the difference between the input and output currents of the LDO. Certain aspects of the present disclosure are directed to an LDO having a lower $I_Q$ as compared to conventional LDO implementations. For example, the $I_Q$ of the LDO may be reduced by simultaneously tracking the input and output voltages and configuring the LDO into a pass-through mode of operation prior to the LDO transitioning to the drop-out zone of operation, as described in more detail herein.

Figure 2:
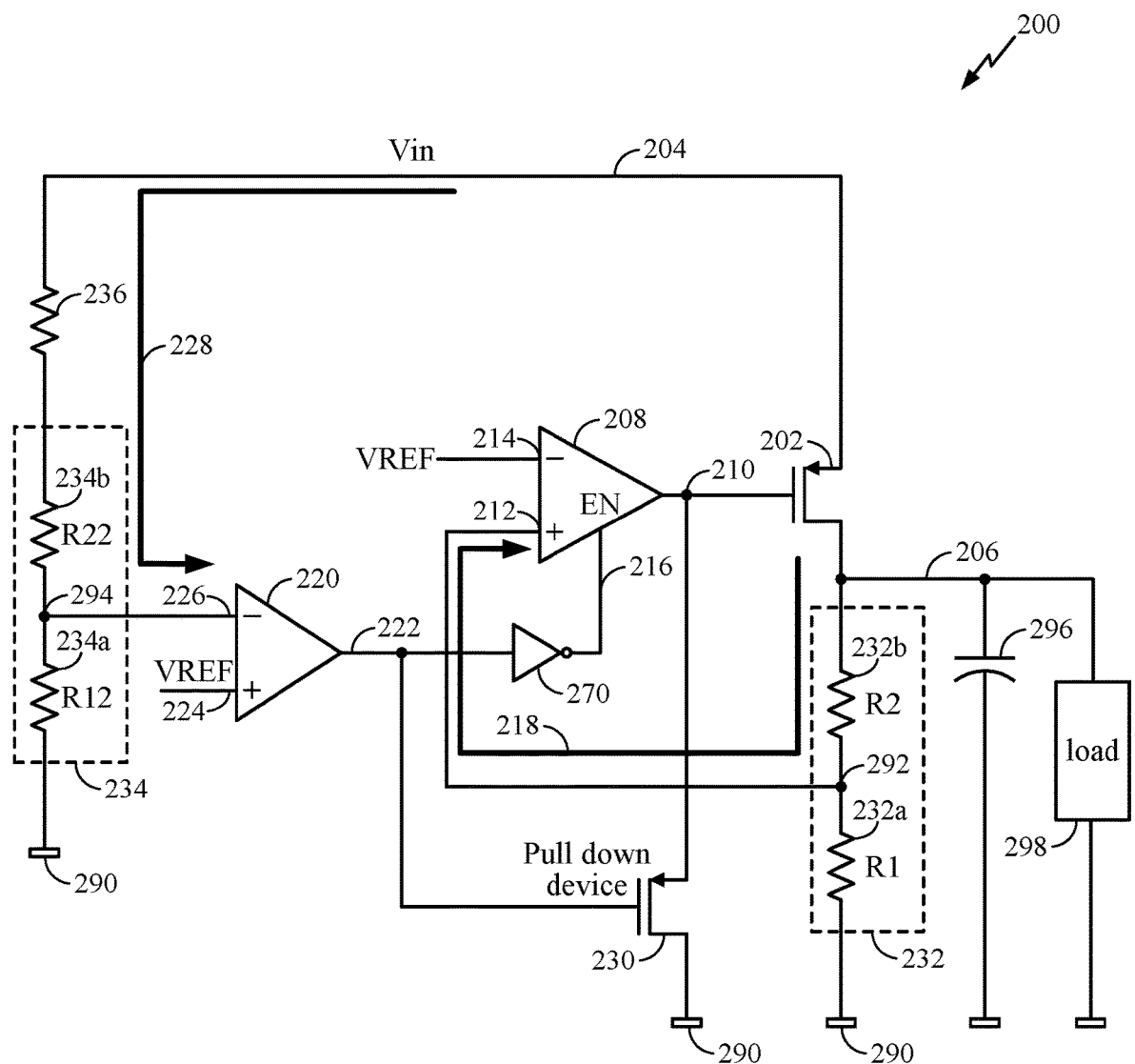
FIG. 2 is a schematic diagram of an example low-dropout (LDO) regulator, in accordance with certain aspects of the present disclosure.

FIG. 2 is a schematic diagram of an example LDO regulator 200, in accordance with certain aspects of the present disclosure. The LDO regulator 200 may have a lower $I_Q$ than conventional LDOs, as described in more detail herein. As illustrated, the LDO regulator 200 may be implemented with a pass device 202 coupled between an input voltage node 204 and an output voltage node 206. The pass device 202 may be a transistor (e.g., p-type metal-oxide-semiconductor (PMOS) transistor, as depicted in FIG. 2). The output voltage node 206 may be coupled to a load capacitive element 296 and a load 298, as illustrated. During a regulation mode, the pass device 202 may be driven in a saturation region to generate a regulated output voltage (Vout) at the output voltage node 206 based on the input voltage (Vin) at the input voltage node 204. In certain aspects, the pass device 202 may be driven in a linear region of operation such that the input voltage node 204 is effectively shorted to the output voltage node 206, putting the LDO regulator 200 into a pass-through mode of operation, as described in more detail herein. As used herein, two nodes are considered to be shorted if a switch (e.g., a transistor) between the nodes is in a closed position.

The LDO regulator 200 may include an amplifier 208 used to drive the pass device 202 to regulate the output voltage at the output voltage node 206 based on the input voltage at the input voltage node 204. The output 210 of the amplifier 208 may be coupled to the gate of the pass device 202. A first input 212 (e.g., a positive input) of the amplifier 208 may be coupled to the output voltage node 206 via a feedback path 218. A reference voltage (labeled "VREF") may be applied to a second input 214 (e.g., a negative input) of the amplifier 208. In certain aspects, the first input 212 may be coupled to a tap node 292 of a voltage divider circuit 232 coupled between the output voltage node 206 and a reference potential node 290 (e.g., electric ground), as described in more detail herein. For example, the amplifier 208 may be used to compare a voltage representative of the output voltage at the output voltage node 206 (e.g., the voltage at the tap node 292) with the reference voltage (VREF).

The LDO regulator 200 includes a comparator 220 that may be used to compare a voltage representative of an input voltage at the input voltage node 204 with VREF. In other words, the comparator 220 may receive a voltage at a tap node 294 of a voltage divider circuit 234 coupled between the input voltage node 204 and the reference potential node 290 (e.g., electric ground), as illustrated. The output 222 of the comparator 220 may be coupled to an enable input 216 of the amplifier 208. Depending on the output of the comparator 220, the amplifier 208 may be enabled or disabled. For example, an inverter 270 may be coupled between the output of the comparator 220 and the enable input 216. Thus, if the output voltage of the comparator 220 is logic high, the amplifier 208 may be disabled via the enable input 216. As illustrated, a first input 226 (e.g., a negative input) of the comparator 220 may be coupled to the input voltage node 204 via a voltage-sensing path 228. A reference voltage may be applied to a second input 224 (e.g., a positive input) of the comparator 220. In certain aspects, the second input 214 of the amplifier 208 and the second input 224 of the comparator 220 may be coupled together to the same reference voltage node providing VREF. For other aspects, the two reference voltages may be different.

The LDO regulator 200 also includes a pull-down device 230 coupled between the gate of the pass device 202 and the reference potential node 290 (e.g., electric ground). The pull-down device 230 may be a transistor (e.g., an n-type metal-oxide-semiconductor (NMOS) transistor). The output 222 of the comparator 220 is further coupled to the gate of the pull-down device 230. Depending on the output voltage of the comparator 220, the pull-down device 230 may effectively short the gate of the pass device 202 to the reference potential node 290 (e.g., electric ground). For example, if the output voltage of the comparator 220 is logic high, the pull-down device 230 may be driven into a linear region, and thus, the gate of the pass device 202 is effectively shorted to the reference potential node 290 via the pull-down device 230. When the gate of the pass device 202 is shorted to the reference potential node 290, the pass device 202 may be driven in the linear region of operation, effectively shorting the input voltage node 204 to the output voltage node 206.

Certain aspects of the present disclosure implement the LDO regulator 200 with a pair of voltage divider circuits 232, 234, as described herein. The voltage divider circuit 232 has a resistive element 232a and a resistive element 232b, which are coupled together at the tap node 292. The tap node 292 of the voltage divider circuit 232 may be coupled to the first input 212 of the amplifier 208. Similarly, the voltage divider circuit 234 has a resistive element 234a and a resistive element 234b, which are coupled together at the tap node 294. The tap node 294 of the voltage divider circuit 234 may be coupled to the first input 226 of the comparator 220.

In certain aspects of the present disclosure, the voltage divider ratio of the voltage divider circuit 232 may be the same as the voltage divider ratio of the voltage divider circuit 234. For example, the resistive element 232a and the resistive element 234a may have the same resistance, and the resistive element 232b and the resistive element 234b may have the same resistance. For example, resistive elements 234a and 234b may be replicas of resistive elements 232a and 232b, respectively, such that the voltage divider ratio of the first voltage divider circuit 232 and the second voltage divider circuit 234 are the same and may track together with changes in temperature.

The LDO regulator 200 continuously tracks the input voltage at the input voltage node 204 and the output voltage at the output voltage node 206 to determine when the input voltage approaches the output voltage. When the input voltage matches (or falls within a certain small voltage above) the output voltage, the LDO regulator 200 is configured in a pass-through mode of operation, as described herein. In certain aspects, a resistive element 236 may be coupled between the voltage divider circuit 234 and the input voltage node 204. The resistive element 236 may add a degree of freedom by generating a larger voltage drop between the input voltage node 204 and the tap node 294 as compared to the voltage drop between the output voltage node 206 and the tap node 292. As such, the LDO regulator 200 is forced into the pass-through mode when the input voltage is equal to some threshold voltage greater than the output voltage, the threshold voltage being set based on the extra voltage drop provided by the resistive element 236. In certain aspects, instead of having the resistive element 236, the resistance of the resistive element 234b may be set higher than the resistance of the resistive element 232b. By forcing the LDO regulator 200 into a pass-through mode when the input voltage matches the output voltage or when the input voltage matches some threshold voltage greater than the output voltage, the relatively large $I_Q$ associated with an LDO entering the drop-out zone of operation is reduced by preventing the LDO from entering the drop-out zone of operation.

In certain aspects of the present disclosure, the tap node 294 of the voltage divider circuit 234 may be coupled to a positive input of the comparator 220, and a reference node providing VREF may be coupled to the negative input of the comparator 220. In this implementation, the inverter 270 coupled between the output 222 of the comparator 220 and the enable input 216 may be replaced by a short, and an inverter (not shown) may be coupled between the output 222 of the comparator 220 and the gate of the pull-down device 230.

Figure 3:
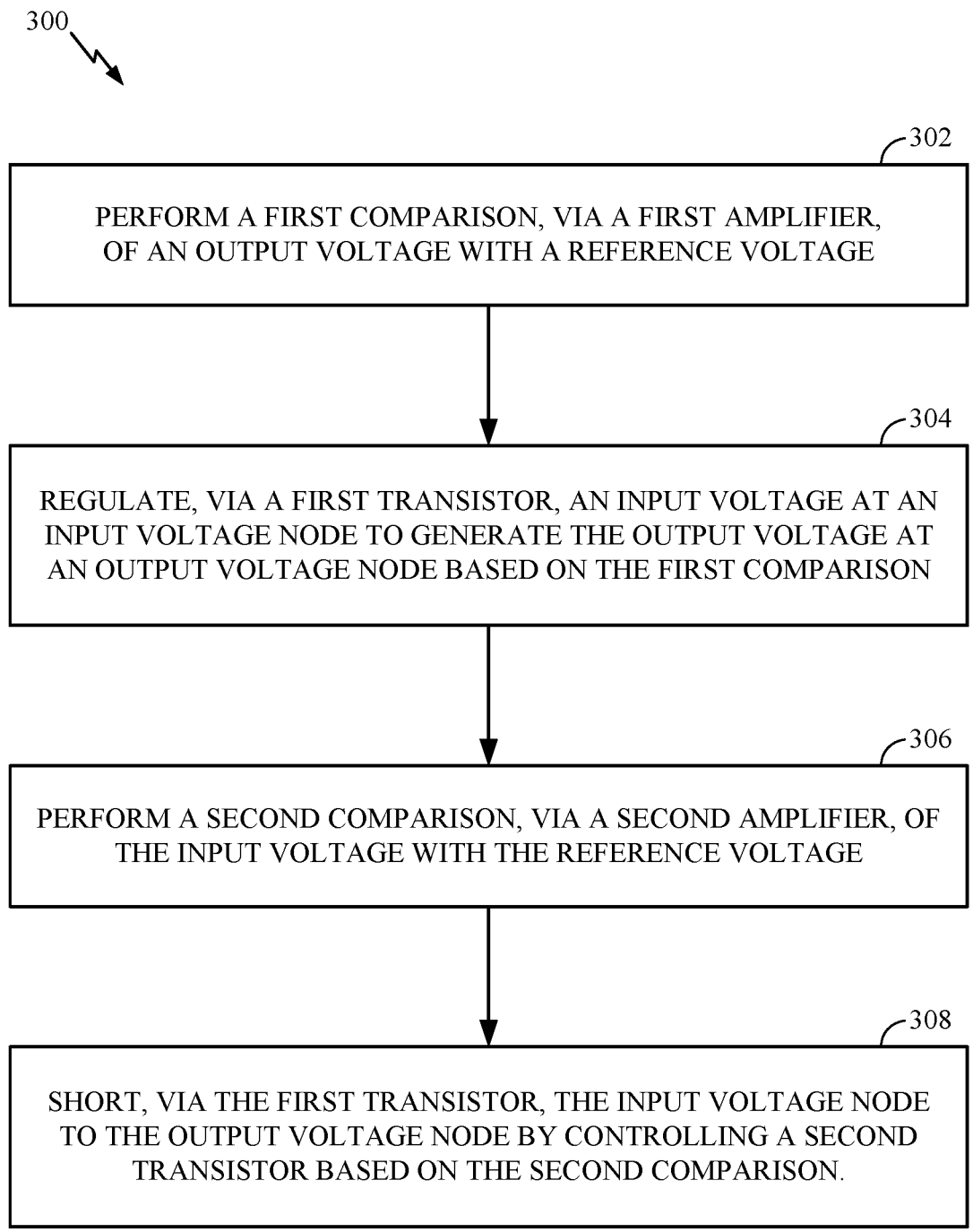
FIG. 3 is a flow diagram of example operations for voltage regulation, in accordance with certain aspects of the present disclosure.

FIG. 3 illustrates example operations 300 for voltage regulation, in accordance with certain aspects of the present disclosure. The operations 300 may be performed by a circuit, such as the LDO regulator 200.

The operations 300 begin at block 302 with an LDO regulator (e.g., LDO regulator 200) performing a first comparison, via a first amplifier (e.g., via amplifier 208), of an output voltage (Vout) with a reference voltage (VREF), and at block 304, regulating, via a first transistor (e.g., pass device 202), an input voltage (Vin) at an input voltage node (e.g., input voltage node 204) to generate the output voltage at an output voltage node (e.g., output voltage node 206) based on the first comparison. At block 306, the LDO regulator may perform a second comparison, via a second amplifier (e.g., comparator 220), of the input voltage with the reference voltage, and at block 308, short, via the first transistor, the input voltage node to the output voltage node by controlling a second transistor (e.g., pull-down device 230) based on the second comparison.

In certain aspects, shorting the input voltage node to the output voltage node at block 308 may include setting a gate voltage of the first transistor coupled between the input voltage node and the output voltage node to a reference potential (e.g., electrical ground). In some cases, the operations 300 may also include disabling the first amplifier when the gate voltage of the first transistor coupled between the input voltage node and the output voltage node is set to the reference potential.

In certain aspects, performing the second comparison of the input voltage with the reference voltage at block 306 entails comparing a voltage representative of the input voltage with the reference voltage. In certain aspects, performing the first comparison of the output voltage with the reference voltage at block 302 involves comparing a voltage representative of the output voltage with the reference voltage. In some cases, the operations 300 further include disabling the first amplifier based on the second comparison.

In other words, a voltage provided at a first input (e.g., first input 212) of a first amplifier (e.g., amplifier 208) may be compared to a reference voltage provided at a second input (e.g., second input 214) of the first amplifier. The voltage provided at the first input of the first amplifier may be a voltage representative of the output voltage, as described herein. The voltage representative of the output voltage may be provided via a first feedback path (e.g., the first feedback path 218). Depending on the comparison by the first amplifier (e.g., amplifier 208), an output voltage from the first amplifier may be applied to the gate of a pass device (e.g., pass device 202) in order to generate a desired output voltage at the output voltage node. For example, an output voltage from the first amplifier may drive the gate of the pass device 202 so that a desired output voltage (e.g., 3V) is generated based on the input voltage (e.g., 4.5V).

As described herein, a voltage provided at a first input (e.g., first input 226) of a second amplifier (e.g., comparator 220) may be compared to a reference voltage provided at a second input (e.g., second input 224) of the second amplifier. The reference voltage at the second input of the second amplifier may be the same as the reference voltage at the second input of the first amplifier. In certain aspects, the voltage provided to the first input of the second amplifier may be a voltage representative of the input voltage. The voltage representative of the input voltage may be provided via a voltage-sensing path (e.g., voltage-sensing path 228). Depending on the comparison by the second amplifier, an output voltage from the second amplifier may be applied to the gate of a pull-down device (e.g., pull-down device 230) and to an enable input (e.g., enable input 216) of the first amplifier, which may result in shorting of the input voltage node to the output voltage node (e.g., by driving the pass device 202 in a saturation region of operation). For example, when the input voltage decreases to a voltage threshold (e.g., the input voltage matches the output voltage), the logic state of the output voltage of the second amplifier transitions, indicating that the LDO is transitioning into drop-out zone. For example, the output voltage of the second amplifier may transition from logic low to logic high and drive the gate of the pull-down device so that the gate of the pass device 202 is pulled down to a reference potential (e.g., electric ground). The output voltage from the second amplifier may also disable the first amplifier via the enable input of the first amplifier. As a result, the first amplifier is turned off while the pass device is fully turned on, thereby shorting the input voltage node to the output voltage node, forcing the LDO into pass-through mode.

In the pass-through mode, the $I_Q$ may only include the current through resistors coupled to the input voltage node (e.g., resistive elements 234a, 234b, and 236) and the current through the second amplifier (e.g., comparator 220). In this way, the $I_Q$ may be reduced to a few microamps (μA) when the LDO is operating in the pass-through mode.

The various operations of methods described above may be performed by any suitable means capable of performing the corresponding functions. The means may include various hardware and/or software component(s) and/or module(s), including, but not limited to a circuit, an application-specific integrated circuit (ASIC), or processor. Generally, where there are operations illustrated in figures, those operations may have corresponding counterpart means-plus-function components with similar numbering.

In certain aspects, means for regulating may comprise an amplifier such as the amplifier 208 and/or a transistor, such as the pass device 202. In certain aspects, means for shorting may comprise an amplifier such as the comparator 220, and/or a transistor, such as the pull-down device 230. In certain aspects, means for performing a comparison may include an amplifier, such as the amplifier 208 and/or comparator 220. In certain aspects, means for setting may include an amplifier, such as comparator 220, and/or a transistor, such as the pull-down device 230. In certain aspects, means for disabling may include an enable input, such as the enable input 216 of the amplifier 208, an inverter, such as the inverter 270, and/or an amplifier, such as the comparator 220. The amplifiers may be implemented with operational amplifiers of different forms, including, but not limited to inverting amplifiers, non-inverting amplifiers, voltage followers, comparators, differential amplifiers, and summing amplifiers. The transistors may be p-type or n-type metal-oxide-semiconductor transistors.

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The various illustrative logical blocks, modules, and circuits described in connection with the present disclosure may be implemented or performed with discrete hardware components designed to perform the functions described herein. The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A circuit for voltage regulation, comprising:
   a first transistor coupled between an input voltage node and an output voltage node of the circuit;
   a first amplifier having an output coupled to a gate of the first transistor, wherein a feedback path couples the output voltage node to an input of the first amplifier;
   a second amplifier having an output coupled to an enable input of the first amplifier, wherein a voltage-sensing path couples the input voltage node to an input of the second amplifier; and
   a second transistor coupled between the gate of the first transistor and a reference potential node, the output of the second amplifier being coupled to a gate of the second transistor.

2. The circuit of claim 1, further comprising an inverter coupled between the output of the second amplifier and the enable input of the first amplifier.

3. The circuit of claim 1, further comprising a first voltage divider circuit coupled to the output voltage node, a tap node of the first voltage divider circuit being coupled to the input of the first amplifier.

4. The circuit of claim 3, further comprising a second voltage divider circuit coupled to the input voltage node, a tap node of the second voltage divider circuit being coupled to the input of the second amplifier.

5. The circuit of claim 4, wherein a voltage divider ratio of the first voltage divider circuit is the same as a voltage divider ratio of the second voltage divider circuit.

6. The circuit of claim 5, further comprising a resistive element coupled between the second voltage divider circuit and the input voltage node.

7. The circuit of claim 1, wherein the first transistor comprises a p-type metal-oxide-semiconductor (PMOS) transistor.

8. The circuit of claim 1, wherein the second transistor comprises an n-type metal-oxide-semiconductor (NMOS) transistor.

9. The circuit of claim 1, wherein another input of the first amplifier is coupled to a reference voltage node, and wherein another input of the second amplifier is coupled to the reference voltage node.

10. A method for power regulation, comprising:
performing a first comparison, via a first amplifier, of an output voltage with a reference voltage;
regulate, via a first transistor, an input voltage at an input voltage node to generate the output voltage at an output voltage node based on the first comparison;
performing a second comparison, via a second amplifier, of the input voltage with the reference voltage; and
shorting, via the first transistor, the input voltage node to the output voltage node by controlling a second transistor based on the second comparison.

11. The method of claim 10, wherein shorting the input voltage node to the output voltage node comprises setting a gate voltage of the first transistor coupled between the input voltage node and the output voltage node to a reference potential.

12. The method of claim 11, further comprising disabling the first amplifier when the gate voltage of the first transistor is set to the reference potential.

13. The method of claim 10, wherein performing the second comparison of the input voltage with the reference voltage comprises comparing a voltage representative of the input voltage with the reference voltage.

14. The method of claim 10, wherein performing the first comparison of the output voltage with the reference voltage comprises comparing a voltage representative of the output voltage with the reference voltage.

15. The method of claim 10, further comprising disabling the first amplifier based on the second comparison.

16. An apparatus for power regulation, comprising:
means for performing a first comparison of an output voltage with a reference voltage;
means for regulating an input voltage at an input voltage node to generate the output voltage at an output voltage node based on the first comparison;
means for performing a second comparison of the input voltage with the reference voltage; and
means for shorting the input voltage node to the output voltage node by controlling a second transistor based on the second comparison.

17. The apparatus of claim 16, wherein the means for shorting the input voltage node to the output voltage node comprises means for setting a gate voltage of the means for regulating coupled between the input voltage node and the output voltage node to a reference potential.

18. The apparatus of claim 17, further comprising means for disabling the means for performing the first comparison when the gate voltage of the means for regulating coupled between the input voltage node and the output voltage node is set to the reference potential.

19. The apparatus of claim 16, wherein the means for performing the second comparison of the input voltage with the reference voltage comprises means for comparing a voltage representative of the input voltage with the reference voltage.

20. The apparatus of claim 16, wherein the means for performing the first comparison of the output voltage with the reference voltage comprises means for comparing a voltage representative of the output voltage with the reference voltage.

* * * * *